United States Patent [19]

Wolanin et al.

[11] Patent Number: 5,280,953
[45] Date of Patent: Jan. 25, 1994

[54] DISPLACEMENT RESPONSIVE AIR BAG VENT

[75] Inventors: Michael J. Wolanin, Hartland; Laura C. Stevenson, Ann Arbor; David E. Pettigrove, Brighton; Jack L. Jensen, Highland; John W. Melvin, Ann Arbor, all of Mich.; Laura A. Hawthorn, Vandalia, Ohio; Hubert P. Blom, Rochester Hills, Mich.

[73] Assignee: General Motors Corporation, Detroit, Mich.

[21] Appl. No.: 987,965

[22] Filed: Nov. 25, 1992

[51] Int. Cl.⁵ ............................................. B60R 21/30
[52] U.S. Cl. .................... 280/739; 280/738; 280/743 A; 280/742; 280/736
[58] Field of Search ............ 280/738, 739, 743 A, 280/742, 743, 736, 728, 726; 137/601; 251/294, 145; 244/118.5, 121

[56] References Cited

U.S. PATENT DOCUMENTS

| | | | |
|---|---|---|---|
| 3,527,475 | 9/1970 | Carey et al. | 280/739 |
| 3,573,885 | 4/1971 | Brawn et al. | 280/150 |
| 3,642,303 | 2/1972 | Irish et al. | 280/150 |
| 3,879,056 | 4/1975 | Kawashima et al. | 280/743 A |
| 4,097,065 | 6/1978 | Okada et al. | 280/737 |
| 4,262,931 | 4/1981 | Strasser et al. | 280/729 |
| 4,360,223 | 11/1982 | Kirchoff | 280/729 |
| 4,500,114 | 2/1985 | Grey, Jr. | 280/738 X |
| 4,907,676 | 3/1990 | Shirdavani | 251/294 |
| 5,007,662 | 4/1991 | Abramczyk et al. | 280/739 |
| 5,016,913 | 5/1991 | Nakajima et al. | 280/738 |
| 5,044,663 | 9/1991 | Seizert | 280/730 |

Primary Examiner—David M. Mitchell
Assistant Examiner—Christopher P. Ellis
Attorney, Agent, or Firm—Charles E. Leahy

[57] ABSTRACT

An occupant restraint air bag assembly includes an air bag having a base wall portion communicating with an inflator and a face wall for contacting the occupant upon inflation of the bag. A vent opening is provided in the base wall portion of the air bag for venting a portion of the inflation gas from the air bag to the occupant compartment. A valve flap carried by the air bag is operable to a position closing the vent opening to contain the inflation gas within the air bag. A tether has a first end connected to the valve flap and a second end attached to the face wall so that the inflation of the air bag and consequent displacement of the face wall pulls the tether to close the valve flap. The vent opening is preferably a plurality of spaced apart openings and the tether progressively moves the valve flap across the openings to progressively close the vent opening in response to the progressive travel of the face wall toward the occupant. If desired, one or more additional vent openings with flap valves may be provided and operated by tethers of different operative lengths to provide selected and variable control over the venting of inflation gas from the air bag in response to displacement of the bag.

8 Claims, 4 Drawing Sheets

DISPLACEMENT RESPONSIVE AIR BAG VENT

The invention relates to a vehicle air bag and more particularly provides an air bag having a venting arrangement responsive to the degree of displacement of the air bag toward the occupant.

BACKGROUND OF THE INVENTION

It is well known to provide an inflatable air bag for restraining a vehicle occupant. The air bag assembly includes a folded bag which is connected to a source of inflation gas. Release of the inflation gas into the air bag causes the bag to expand rapidly so that a face wall of the air bag is displaced toward contact with the occupant. It is well known to provide one or more vent openings in the walls of the air bag to vent inflation gas from the interior of the air bag into the occupant compartment. These air bag vents are commonly provided in a base wall portion of the air bag to direct the vented gas away from the occupant. The vent opening may be provided by a gas permeable fabric panel sewn into the bag. In addition, it is well known to employ various flow control devices to control the flow of inflation gas through the vent opening.

The present invention provides a new and improved air bag assembly in which the degree of opening and closing of the vent is dependent upon the displacement of the air bag toward the fully deployed position.

SUMMARY OF THE INVENTION

An occupant restraint air bag assembly includes an air bag having a base wall portion communicating with an inflator providing inflation gas and an occupant contacting face wall for contacting the occupant upon inflation of the bag. A vent opening is provided in the base wall portion of the air bag for venting a portion of the inflation gas from the air bag to the occupant compartment. A valve flap carried by the air bag is operable to a position closing the vent opening to contain the inflation gas within the air bag. A tether is provided for operating the valve flap in response to the displacement of the face wall toward the occupant. The tether has a first end connected to the valve flap and a second end attached to the face wall so that the inflation of the air bag and consequent displacement of the face wall pulls the tether to close the valve flap. The vent opening is preferably a plurality of openings spaced apart from one another and the tether acts to progressively move the valve flap across the openings to progressively close the vent opening in response to the progressive travel of the face wall toward the occupant. The valve flap is preferably anchored in the open position by sewing the flap with stitches which release when the displacement of the face wall tensions the tether to operate the valve flap. If desired, one or more additional vent openings with flap valves may be provided and operated by tethers of different operative lengths to provide selected and variable control over the venting of inflation gas from the air bag in response to displacement of the bag.

Accordingly, the object, feature, and advantage of the invention resides in the provision of a normally open air bag vent which is closed in response to the degree of displacement of the air bag from the stored position to the inflated position.

A further feature, object, and advantage of the invention resides in the provision of an air bag vent opening selectively closed by a valve flap which is pulled across the vent opening by a tether attached to the air bag to be tensioned during displacement of the air bag to the inflated condition.

A further object, feature, and advantage resides in the provision of a plurality of vent openings in an air bag each having associated valve flaps independently operated by tethers attached to the air bag for independently pulling the valve flaps closed in response to the degree of displacement of the air bag to the fully inflated position.

BRIEF DESCRIPTION OF THE DRAWINGS

These and other features, objects and advantages of the invention will become apparent upon consideration of the description of the preferred embodiment of the invention and the appended drawings in which.

DESCRIPTION OF THE PREFERRED EMBODIMENT

Figure 1:
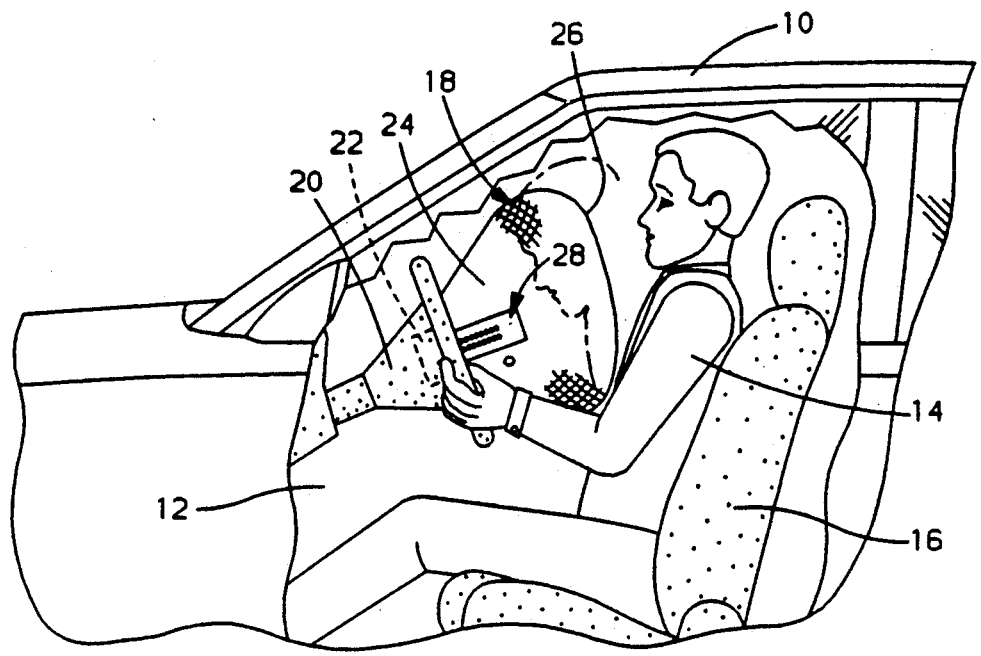
FIG. 1 is a side elevation view of an occupant compartment showing the air bag of this invention mounted on a steering wheel.

FIG. 1 shows a motor vehicle 10 having an occupant compartment 12 in which occupant 14 is seated in seat 16. An air bag 18 of flexible fabric material is mounted on the steering column 20 and receives inflation gas from an inflator 22. The air bag 18 includes a base wall portion 24 attached to the steering wheel and a face panel 26 for contact with the occupant 14, and which cooperate to define a chamber 27 within the air bag 18.

FIG. 1 also shows that the air bag 18 has a vent 28 provided in the base wall portion 24, it being understood that another vent 29 is located on the opposite side of the air bag 18. Each vent has an associated closure valve.

Figure 2:
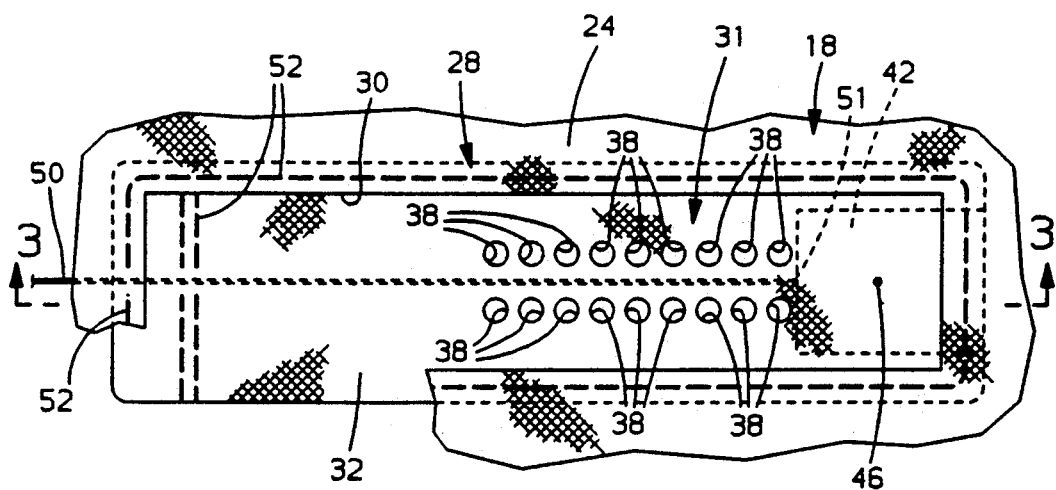
FIG. 2 is an enlarged fragmentary view showing the vent valve assembly for venting inflation gas from the air bag.
Figure 3:
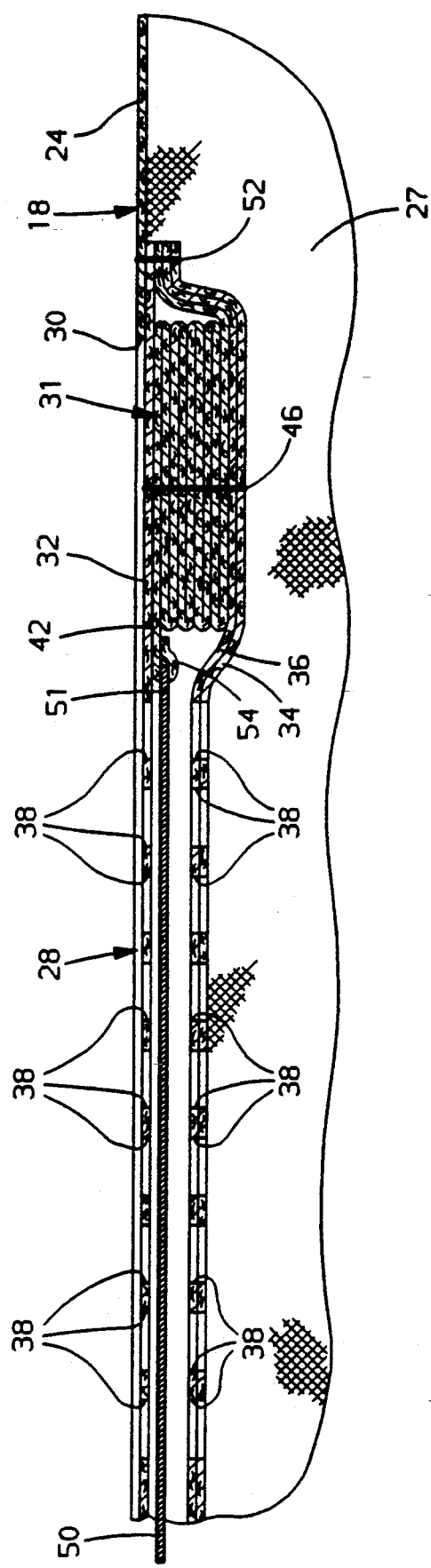
FIG. 3 is a sectional view taken in the direction of arrows 3—3 of FIG. 2 and showing the details of construction of the air bag vent valve assembly, including the vent openings, the valve flap, and the tether for closing the valve flap across the vent openings.

FIGS. 2 and 3 show the construction of the vent 28 and its closure valve. The air bag base wall portion 24 has a long slot 30, cut or punched therefrom. A vent valve assembly, generally indicated at 31, is constructed of an outer panel or strip 32 and two inner panels or strips 34 and 36 which overlie one another and have a plurality of small vent holes 38 cut therein. A valve flap 42 is interposed between the outer strip 32 and the inner strips 34 and 36 and folded in a stack of accordion pleats as best shown in FIG. 3. The vent flap 42 is retained in this stacked condition by a stitch 46 which extends through the outer strip 32, the stacked valve flap 42 and the inner strips 34 and 36. However, the stitch 46 is not necessary. Furthermore, an adhesive or other retainer may be employed to retain the flap in the stacked condition.

As seen in FIGS. 2 and 3, the outer dimensions of the vent valve assembly 31 are wider and longer than the dimension of the slot 30 in the air bag 18 so that the vent valve assembly 31 may be sewn to the air bag 18 by a row of stitches 52 which encircle the slot 30.

A tether wire 50 has an end 51 which is captured in a loop 54 sewn, glued, or otherwise attached at the end of the valve flap 42. As seen in FIG. 2, the tether 50 passes through the row of stitches 52 so that the tether wire 50 is guidably supported in the air bag 18.

Figure 4A:
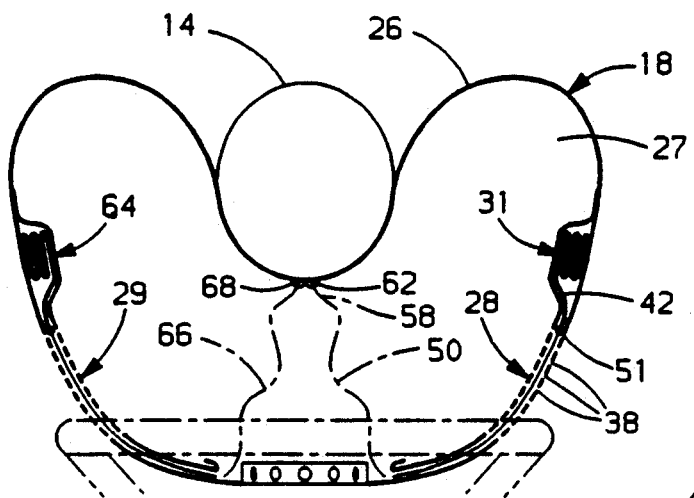
FIG. 4a is a schematic view showing an air bag deployment in which the air bag has obtained only a limited degree of displacement to the inflated position so that the vent operating tethers remain slackened and the vent openings remain open to vent inflation gas to the occupant compartment.
Figure 4B:
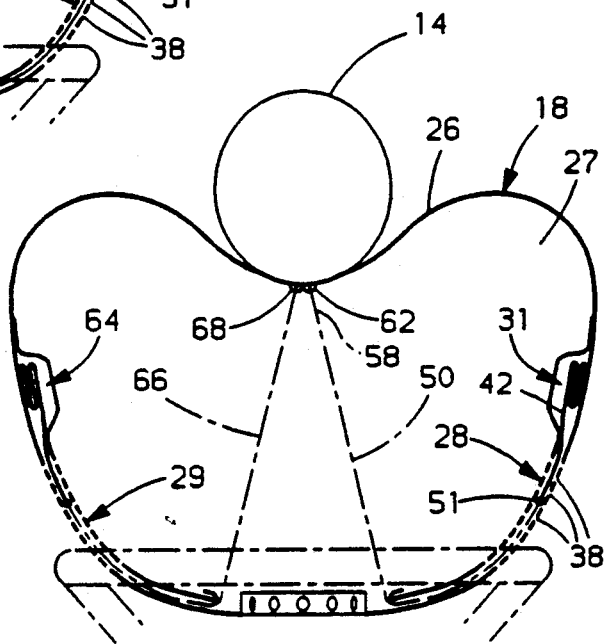
FIG. 4b is a view similar to 4a but showing the air bag inflated to a greater degree of air bag displacement so that the tethers are tensioned to begin closing the valve flaps over the vent openings.
Figure 4C:
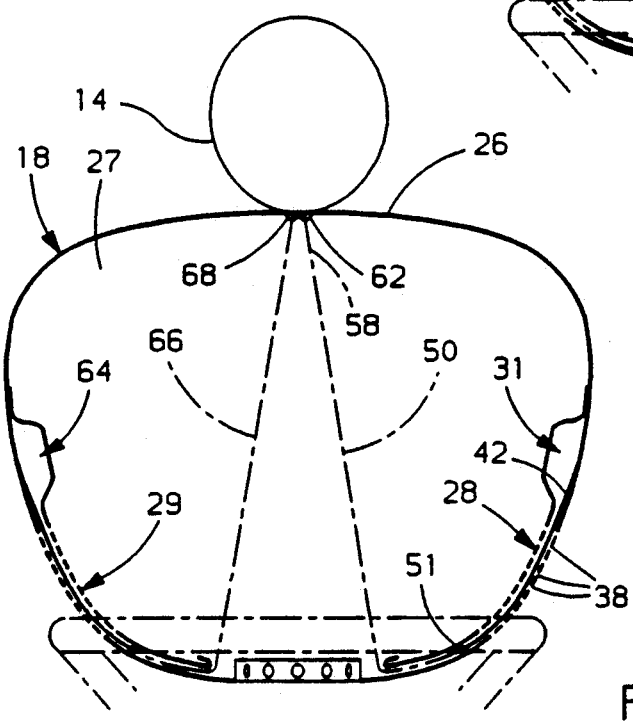
FIG. 4c is a view similar to 4a and 4b but showing a fully displaced air bag in which the tethers are tensioned and have pulled the valve flaps fully over the vent openings.

Referring to FIGS. 4a, 4b, and 4c, it is seen that the tether wire 50 has an end 58 which is suitably attached to the face panel 26 at a fabric loop 62 sewn to the face panel 26 on the inside surface thereof. FIG. 4a also shows that the vent 29 located on the opposite side of the air bag 18 from the vent 28 has a vent valve assembly 64 associated therewith which is identical to the vent valve assembly 31. The vent valve assembly 64 is operated by a tether wire 66 which is attached to the inside of the face panel 26 by a loop of fabric 68.

FIGS. 4a, 4b, and 4c schematically demonstrate three different air bag deployment conditions, it being understood that the air bag 18 is normally folded upon itself and concealed within a plastic container on the steering wheel until the introduction of inflation gas from the inflator 22 causes the air bag to burst from the container and begin displacement of the face panel 26 toward the occupant 14.

FIG. 4a shows a deployment condition in which the displacement of the face panel 26 is limited by the position of the occupant so that the tether wires 50 and 66 remain in a slackened condition which permit the vents 28 and 29 remain in the open condition shown in FIGS. 2 and 3.

FIG. 4b shows a different deployment condition in which the face panel 26 has obtained a further degree of displacement in which tether wires 50 and 66 and have become tensioned and the tether wire 50 has pulled the valve-flap 42 to sever the flap stitch 46 and permit the valve flap 42 to move partway across the vent openings 38 so that the aggregate size of the vent openings 28 is partially reduced.

FIG. 4c shows a deployment in which the face panel 26 is fully displaced upon full inflation of the air bag 18 so that the tether 50 has completely unfolded the flap 42 to completely close off the vent openings 38.

It will be appreciated that the use of the air bag vent arragement disclosed herein permits tuning of the air bag system to a wide range of desired performance characteristics. For example, the size, shape, number, and spacing of the vent openings 38 may be varied. In addition, the material of the valve flap 42 can be chosen to be either a gas permeable or impermeable material.

It is also known that the displacement of the air bag 18 to the deployed condition routinely occurs at such speed that the displacement of the bag overtakes the pressure buildup provided by the inflator so that the gas pressure inside the bag is less the ambient air pressure in the passenger compartment. Thus, although the vents are open during displacement, little or no gas may be actually vented from the bag. Thus, a full displacement to the position of FIG. 4c is accomplished with little or no venting, while the partial displacement to the position of FIG. 4a will leave the vent open during pressure buildup so that gas will be vented out of the air bag 18.

Figure 5A:
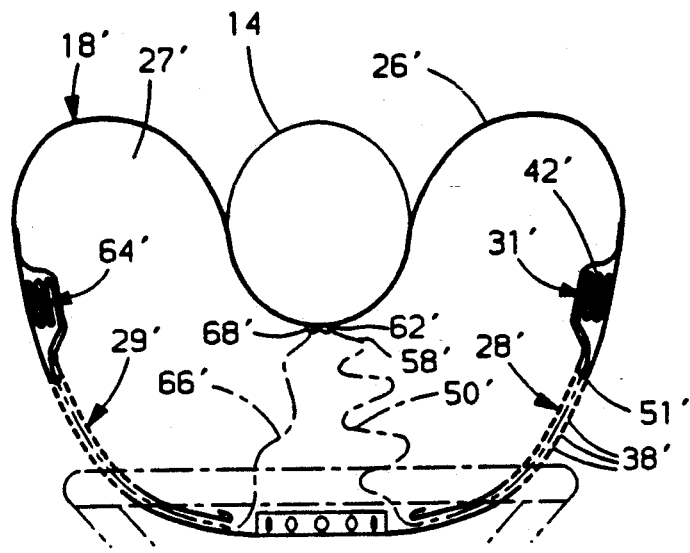
FIG. 5a is a view similar to FIG. 4a but showing an embodiment of the invention in which one tether is longer than another tether and wherein the limited displacement of the air bag permits both tethers to remain in the slackened condition so that the valve flaps remain open in relation to the vent openings to vent inflation gas to the occupant compartment.
Figure 5B:
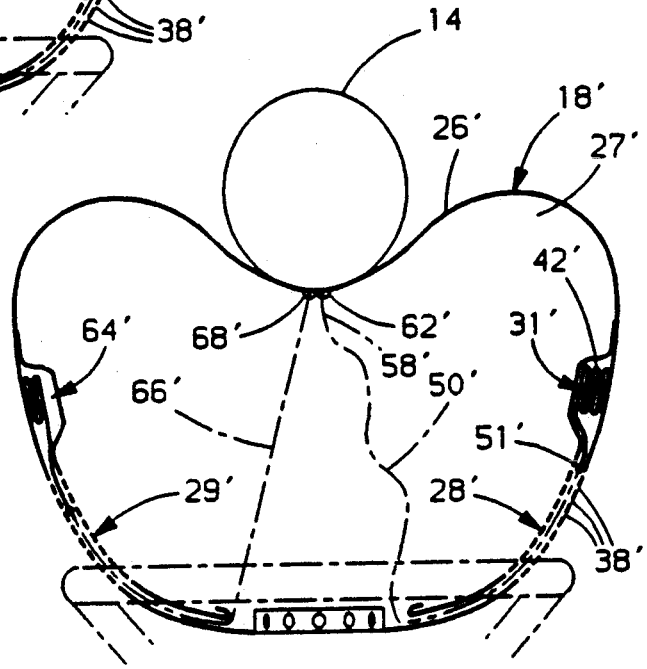
FIG. 5b shows the displacement of the air bag having progressed to tension one of the tethers and begin closing the associated valve flap over the vent opening while the other tether remains slackened to permit the associated valve flap to remain stored.
Figure 5C:
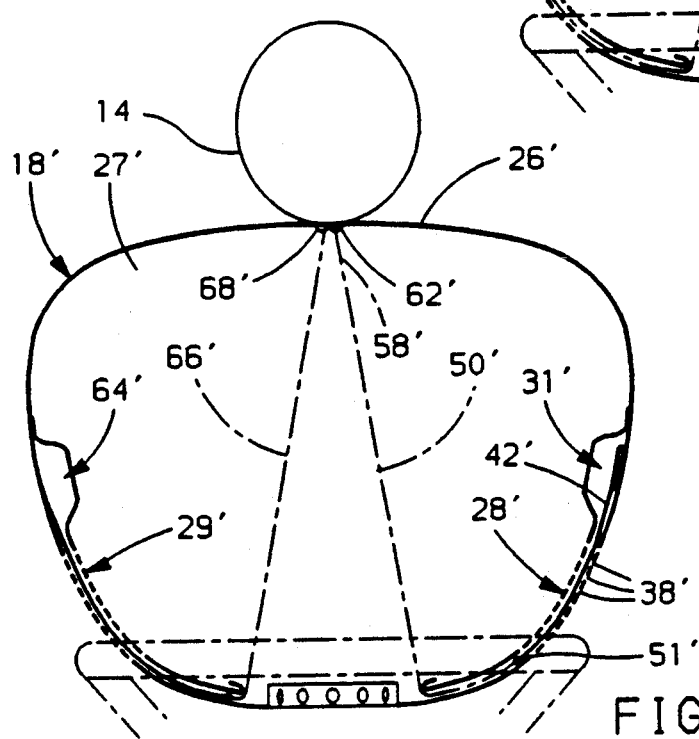
FIG. 5c shows the air bag fully displaced to the inflated condition in which both tethers have been tensioned and the valve flaps closed to block venting of an inflation gas to the occupant compartment.

Furthermore, as shown in FIGS. 5a, 5b, and 5c, the length of the tether wires designated 50' and 66', may be different from each other. For example, in FIG. 5b the shorter length of the tether 66' will cause the vent valve assembly 64' to begin closing while the longer tether wire 50' permits the vent valve assembly 28' to remain fully open. Then, as shown in FIG. 5c, both the vents 28' and 29' are fully closed as the air bag reaches a further degree of displacement.

It will be understood that the length of the valve flap of valve vent assembly 64' is chosen to permit some over-travel of the flap beyond the last of the vent openings so that the tether 66' does not become affixed against further extension which would in turn restrain the air bag face panel 26' against full displacement to the position of FIG. 5c. Thus, the total distance that the front panel 26' is permitted to displace during the unrestricted deployment of FIG. 5c will approximately equal the sum of the slack provided in the tether, the distance the valve flap moves over the vent 29', and the distance of over-travel of the flap beyond the last of the vent openings of the vent 29'.

It will also be understood that the length of the tethers 50 and 66 may be selected of a length to limit the overall displacement of the air bag 18 so that these valve operating tethers will also function as travel limiting tethers for the air bag face wall 26.

The outer strip 32 and the inner strips 34 and 36 of the vent valve assembly of FIG. 3 may be constructed of an open weave fabric mesh screen to define the vent opening.

The tether may be a nylon or fabric strip and may be of continuous one-piece construction with the valve flap 42.

Furthermore, it will be understood that although the air bag shown herein is a driver side air bag, the invention is also applicable to passenger air bags.

Thus, it is seen that the invention provides a new and improved venting arrangement for an air bag assembly. The particular vent valve assembly shown herein is a preferred embodiment of one particular valve construction effective the provide displacement responsive air bag venting of this invention, it being understood that alternative arrangement may be utilized within the teachings of this specification and the claims appended hereto.

The embodiments of the invention in which an exclusive property or privilege is claimed are defined as follows:

1. An occupant restraint air bag comprising:
an inflator for generating inflation gas;
an air bag receiving inflation gas from the inflator to displace the air bag from a stored condition to an occupant restraining condition,
an opening in the air bag and having a closure valve associated therewith for selectively opening and closing the opening to control inflation gas buildup in the air bag,
and means acting between the air bag and the valve for operating the closure valve in response to the degree of displacement of the air bag independent of the degree of said gas pressure build up in the air bag.

2. An occupant restraint air bag comprising:
an inflator for generating inflation gas;
an air bag receiving inflation gas from the inflator to inflate the air bag into contact with the occupant,
an opening in the air bag and having a closure valve associated therewith for selectively opening and closing the opening to control the rate of inflation gas buildup in the air bag,
and a tether located within the air bag and having a first end operably associated with the closure valve and a second end attached to the air bag so that the inflation of the air bag pulls the tether to operate the closure valve and thereby control the inflation of the air bag.

3. An occupant restraint air bag inflatable to restrain an occupant in an occupant compartment, comprising:
an inflator for generating inflation gas;
an air bag having a chamber communicating with the inflator to receive inflation gas,
a vent opening in the air bag having a closure valve normally open to vent a portion of the inflation gas from the chamber to the occupant compartment,
an a tether located within the air bag and having a first end operably associated with the closure valve and a second end attached to the air bag so that the inflation of the air bag pulls the tether to close the closure valve and contain the inflation gas within the air bag.

4. An occupant restraint air bag inflatable to restrain an occupant in an occupant compartment, comprising:
an inflator for generating inflation gas;
an air bag having a chamber communicating with the inflator to receive inflation gas and an occupant contacting face wall displaced toward the occupant upon inflation of the air bag,
a vent opening in the air bag spaced from the face wall for venting a portion of the inflation gas from the chamber to the occupant compartment,
a valve flap carried by the air bag and being operable to a position closing the vent opening to contain the inflation gas with in the air bag,
and a tether for operating the valve flap in response to the displacement of the air bag face wall toward the occupant, said tether having a first end operably associated with the valve flap and a second end attached to the face wall of the air bag so that the inflation of the air bag pulls the tether to close the closure and contain the inflation gas within the air bag.

5. An occupant restraint air bag inflatable to restrain an occupant in an occupant compartment, comprising:
an inflator for generating inflation gas;
an air bag having a base wall portion communicating with the inflator to receive inflation gas and a face wall for contacting the occupant upon inflation of the bag,
a vent opening in base wall portion of the air bag for venting a portion of the inflation gas from the air bag to the occupant compartment,
a valve flap carried by the air bag and being operable to a position closing the vent opening to contain the inflation gas within the air bag,
and a tether for operating the valve flap in response to the travel of the face wall toward the occupant, said tether having a first end operably associated with the valve flap and a second end attached to the occupant contacting wall of the air bag so that the inflation of the air bag pulls the tether to close the closure and contain the inflation gas within the air bag.

6. The air bag of claim 5 further characterized by the vent opening being a plurality of openings spaced along the base wall portion and the tether acting to progressively move the valve flap across the openings to progressively close the vent opening in response to the progressive travel of the occupant contacting wall toward the occupant.

7. The air bag of claim 6 further characterized by the valve flap being anchored in the open position in relation to the vent opening by sewing the flap in the open position by stitches which release when the tether operates the flap.

8. An air bag of claim 5 further characterized by the valve flap being anchored in the open position in relation to the vent opening by sewing the flap in the open position by stitches which release when the tether operates the flap.

* * * * *